US008554521B2

(12) United States Patent
Diguet et al.

(10) Patent No.: US 8,554,521 B2
(45) Date of Patent: *Oct. 8, 2013

(54) DESIGNING AN ASSEMBLY OF OBJECTS IN A COMPUTER-AIDED DESIGN SYSTEM

(75) Inventors: Michael Eric Francois Diguet, Meudon (FR); Adrien Theetten, Saclay (FR); Frederic Guy J. Chauvin, Villepreux (FR)

(73) Assignee: Dassault Systemes, Villacoublay (FR)

( * ) Notice: Subject to any disclaimer, the term of this patent is extended or adjusted under 35 U.S.C. 154(b) by 169 days.

This patent is subject to a terminal disclaimer.

(21) Appl. No.: 12/914,557

(22) Filed: Oct. 28, 2010

(65) Prior Publication Data

US 2011/0112803 A1   May 12, 2011

(30) Foreign Application Priority Data

Nov. 6, 2009 (EP) .................................... 09306066

(51) Int. Cl.
*G06T 19/20* (2011.01)
*G06F 17/50* (2006.01)

(52) U.S. Cl.
USPC ................. 703/1; 345/420; 700/98; 700/103

(58) Field of Classification Search
None
See application file for complete search history.

(56) References Cited

U.S. PATENT DOCUMENTS

| 5,251,290 | A   | * | 10/1993 | Pabon ........................... 345/420 |
| 5,497,453 | A   | * | 3/1996  | Megahed et al. ............. 345/422 |
| 6,219,049 | B1  | * | 4/2001  | Zuffante et al. .................... 703/1 |
| 6,907,573 | B2  | * | 6/2005  | Kohls et al. .................... 715/764 |
| 7,084,884 | B1  | * | 8/2006  | Nelson et al. ................. 345/619 |
| 7,110,005 | B2  | * | 9/2006  | Arvin et al. .................... 345/619 |
| 2003/0067487 | A1 | * | 4/2003 | Kohls et al. .................... 345/764 |
| 2008/0172208 | A1 | * | 7/2008 | Lechine ............................ 703/1 |
| 2009/0172626 | A1 |   | 7/2009  | Pucci et al. |
| 2010/0057645 | A1 | * | 3/2010 | Lauritsen ........................ 706/11 |
| 2011/0270586 | A1 | * | 11/2011 | Diguet et al. ..................... 703/1 |

OTHER PUBLICATIONS

Partial European Search Report for EP 09306066 dated Mar. 11, 2010.
European Search Report for EP 09306066 dated Mar. 11, 2010.

* cited by examiner

*Primary Examiner* — Kamini S Shah
*Assistant Examiner* — Jay B Hann
(74) *Attorney, Agent, or Firm* — Hamilton, Brook, Smith & Reynolds, P.C.

(57) ABSTRACT

An embodiment of a method for designing an assembly of objects in a system of computer-aided design can include:(i) selecting a first object and a second object of the assembly, each of the first object and the second object having interface information; (ii) computing a set of positions of the first object relatively to the second object of the assembly, and (iii) displaying simultaneously representations of the computed positions of the first object relatively to the second object.

15 Claims, 6 Drawing Sheets

DESIGNING AN ASSEMBLY OF OBJECTS IN A COMPUTER-AIDED DESIGN SYSTEM

RELATED APPLICATION(S)

This application claims priority under 35 U.S.C.§119 or 365 to European, Application No. 09306066.3, filed Nov. 6, 2009.

The entire teachings of the above application(s) are incorporated herein by reference.

FIELD OF THE INVENTION

The invention relates to the field of computers programs and systems, and more specifically to the field of designing of an assembly of object in a Computer-Aided Design application.

BACKGROUND

Computer-aided techniques are known to include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of objects (or parts) or assemblies of objects, forming a product, such as the one provided by Dassault Systèmes under the trademark CATIA. These CAD systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mostly specifications of geometry. Specifically, CAD files contain specifications, from which geometry is generated, which in turn allow for a representation to be generated. Geometry and representation may be stored in a single CAD file or multiple ones. CAD systems include graphic tools for representing the modeled objects to the designers; these tools are dedicated to the display of complex objects—the typical size of a file representing an object in a CAD system being in the range of one Megabyte per part, and an assembly may comprise thousands of parts. A CAD system manages models of objects, which are stored in electronic files.

In computer-aided techniques, the graphical user interface (GUI) plays an important role as regards the efficiency of the technique. Most of the operations required for manipulating and/or navigating the modeled objects may be performed by the user (e.g. the designers) on the GUI. Especially, the user may create, modify, and delete the modeled objects forming the product, and also explore the product so as to comprehend how modeled objects are interrelated, e.g. via a product structure. Traditionally, these operations are carried out through dedicated menus and icons which are located on the sides of the GUI. Recently, CAD systems such as CATIA allow calling these functions nearby the representation of the product. The designer does not need anymore to move the mouse towards menus and icons. Operations are thus available within reach of the mouse. In addition, the operations behave semantically: for a given operation selected by the designer, the CAD system may suggests to the designer, still nearby the mouse, a set of new operations according to the former selected operation that the designer is likely to select.

Also known are Product Lifecycle Management (PLM) solutions, which refer to a business strategy that helps companies to share product data, apply common processes, and leverage corporate knowledge for the development of products from conception to the end of their life, across the concept of extended enterprise. By including the actors (company departments, business partners, suppliers, Original Equipment Manufacturers (OEM), and customers), PLM may allow this network to operate as a single entity to conceptualize, design, build, and support products and processes.

Some PLM solutions make it for instance possible to design and develop products by creating digital mockups (a 3D graphical model of a product). The digital product may be first defined and simulated using an appropriate application. Then, the lean digital manufacturing processes may be defined and modeled.

The PLM solutions provided by Dassault Systèmes (under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Such PLM solutions comprise a relational database of products. The database comprises a set of textual data and relations between the data. Data typically include technical data related to the products said data being ordered in a hierarchy of data and are indexed to be searchable. The data are representative of the modeled objects, which are often modeled products and processes.

Product lifecycle information, including product configuration, process knowledge and resources information are typically intended to be edited in a collaborative way.

Current CAD applications allow the user to define spatial relationships between the objects (or parts) of an assembly of objects, e.g. between two products of an assembly of objects. Typically, as know in the art, the user is a designer who moves an object relatively to another object in order to place the object at a specific position. For instance, the designer may wish to place a screw through a hole comprised in a plate. To this aim, the designer selects and moves the screw on the plate until a rough approximate of the desired position of the screw relatively to the hole of the plate is reached. Then, mating properties of the screw and the plate are used to find a position of the screw relatively to the plate, the position being determined according to the location of the screw provided by the designer.

However, positioning an object relatively to another is a difficult and cumbersome task for the designer because the designer has to move the first object over the second one (or parts of them) at the right place, and the first and second object may be really small; for instance, a part of an object may be like a point.

In addition, most of the current solutions propose only one position between two selected objects among a given couple of positions. Thus, these solutions do not provide a global and ordered set of all the relevant solutions between these objects, and therefore, the designer cannot determine what the best solution among the several solutions is. Moreover, if the user does not move the object over a particular element, he/she will not be informed of the corresponding solution.

Incidentally, some solutions propose to the designer positions between two selected objects by using all geometrical elements of the first and second objects, which in turn, can be quickly flooded with useless positions.

Thus, according to the limitations of the existing solutions shortly discussed above, there is a need for improving the recurrent assembly of objects in an easier and faster way such that the productivity of the designer is increased and the design errors minimized.

BRIEF SUMMARY OF THE INVENTION

The invention therefore provides a method for designing an assembly of objects in a system of computer-aided design. The method comprises selecting a first object and a second object of the assembly, each of the first object and the second object having interface information, computing a set of positions of the first object relatively to the second object of the assembly, and displaying simultaneously representations of the computed positions of the first object relatively to the second object.

The method according to the invention may comprise one or more of the following features:
- the simultaneously displayed representations of the computed positions are displayed according to several levels of visibility;
- the simultaneously displayed representations of the computed positions have a respective transparency;
- the simultaneously displayed representations of the computed positions are displayed according to a ranking of the computed positions;
- prior to the step of displaying, the step of ranking the positions of the set of the first object relatively to the second object according to at least one criterion;
- prior to the step of computing the set of positions, the step of adding constraints, upon user actuation, between the first object and the second object;
- the first object and the second object of the assembly are three-dimensional modeled objects and wherein the said at least one criterion is one of the following:
  - a number of constraints between the first object and the second object of the assembly;
  - a number of constraints suggested by a user between the first object and the second object of the assembly, the first and second objects being relatively positioned;
  - a distance between projections in a two-dimensional space of the first object and the second object of the assembly, the first and second objects being relatively positioned;
  - a distance, in a three-dimensional space, between the first object and the second object of the assembly which are relatively positioned;
  - an angle of rotation between the first object and the second object of the assembly which are relatively positioned;
  - the first object and the second object of the assembly, which are relatively positioned, are visible on the graphical user interface;
  - a design error, between the first object and the second object of the assembly which are relatively positioned, is detected;
- the step of computing a set of positions of the first object relatively to the second object of the assembly comprises computing at least one matching of the interface information of the first object and the second object, and solving geometric constraints between the first object and the second object after each computation of said at least one matching;
- the steps of computing at least one matching of the interface information and solving geometric constraints after each computation of said at least one matching are carried out according to a traversal of a graph, wherein: each node of the graph represents a combination of one interface information of the first object and one interface information of the second object, each node of the graph at a given level of the graph, pointing on a parent node, represents the combination already represented by another node in an upper level of said given level, each node of the graph having not solvable geometric constraints is suppressed of the graph, and for a given node, a position of the set of positions is provided by:
  - a set of constraints built from the combination of said given node; and
  - a set of constraints built from the combinations of the parents of said given node;
- the step of computing a set of positions of the first object relatively to the second object of the assembly further comprises computing a first identifier between at least two interface information of the first object and a second identifier between at least two interface information of the second object, associating said first and second identifiers of the interface information to the objects owning respectively said at least two interface information of the first object and said at least two interface information of the second object, and using said first and second identifiers for identifying a matching, during the computation of another matching involving at least one of said first and second objects;
- the step of computing the set of positions of the first object relatively to the second object of the assembly is first performed taking account of the constraints added by the user, and then performed without taking account of the constraints added by the user;
- the step of ranking the positions of the set of the first object relatively to the second object is carried out according to at least two criteria, each criterion of the said at least two criteria being ranked and the positions of the set are ranked in lexicographic order relying on the ranked criteria;
- at the step of selecting a first object and a second object, the steps of identifying at least one publication of the first object and at least one publication of the second object, and computing an interface information of the first object and an interface information of the second object for each said at least one identified publication of the first object and at least one identified publication of the second object;
- the said at least one publication of the first object and the said at least one publication of the second object comprise elements of geometry;
- the interface information of the first object and the interface information of the second object is computed in order to be representative of a coincidence with elements of geometry;
- elements of geometry are restricted to points, lines, planes, and axis systems;
- one of the simultaneously displayed representations of the computed positions is emphasized by placing a cursor on said one of the simultaneously displayed representations upon user action on a haptic device.

The invention further proposes a computer program product having a computer program, stored on a computer readable medium, for designing an assembly of objects in a system of computer-aided design, the computer program comprising code means for causing the system of computer-aided design to take the steps of the method of the invention.

The invention still concerns an apparatus for designing an assembly of objects in a system of computer-aided design, the apparatus comprising means for implementing the steps of the method of the invention.

BRIEF DESCRIPTION OF THE DRAWINGS

A system embodying the disclosed technology will now be described, by way of non-limiting example, and in reference to the accompanying drawings, where.

DETAILED DESCRIPTION OF THE EMBODIMENTS

Figure 1:
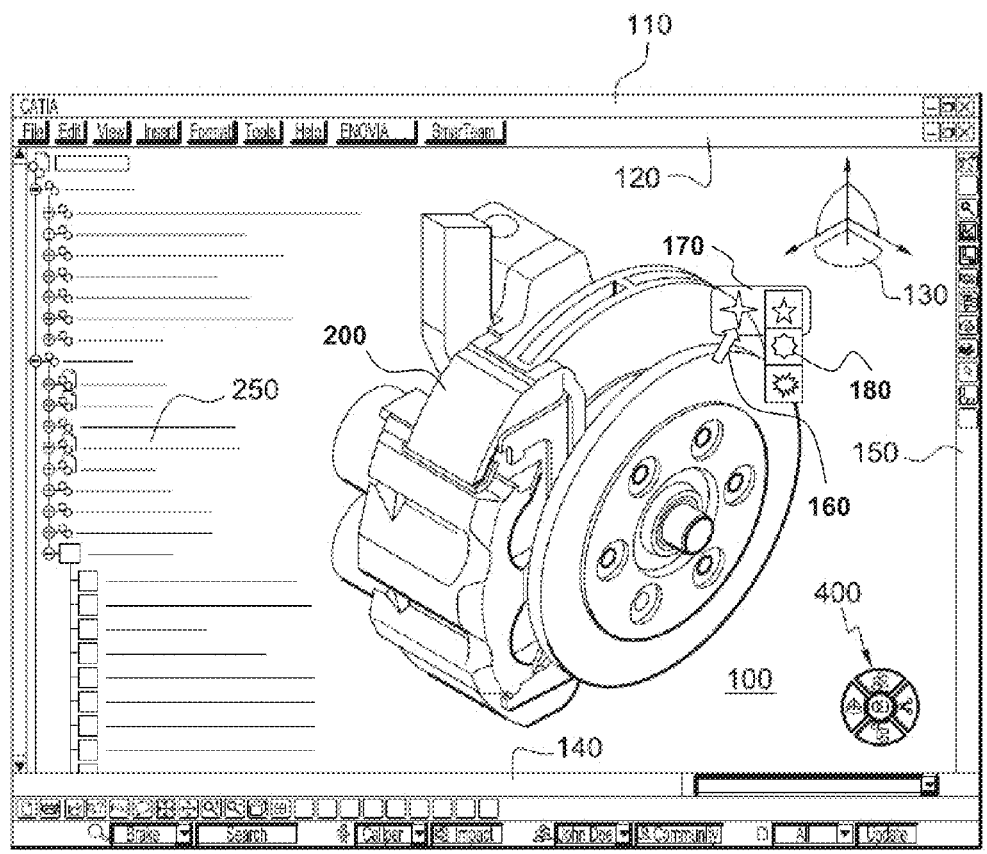
FIG. 1 is a schematic view of typical GUI in a CAD system.

In reference to FIG. 1, the exemplified graphical user interface (or GUI) 100 may be a typical CAD-like interface, having standard menu bars 110, 120, as well as bottom and side toolbars 140, 150. Such menu and toolbars contain a set of user-selectable icons, each icon being associated with one or more operations or functions, as known in the art.

Some of these icons are associated with software tools, adapted for editing and/or working on a modeled product 200 or parts of product 200 such as that displayed in the GUI 100. In the following description, "product", "part", "assembly" and the like may be referred to as "part" for the sake of simplicity. Note that the concept of "part" can in fact be generalized to that of "object", wherein an object can be only a "physical" part of the designed product or, more generally, any software tool participating in the design process (but not necessarily "in" the final product).

The software tools may be grouped into workbenches. Each workbench comprises a subset of software tools. In particular, one of the workbenches is an edition workbench, suitable for editing geometrical features of the modeled product 200. In operation, a designer may for example pre-select a part of the object 200 and then initiate an operation (e.g. change the dimension, color, etc.) or edit geometrical constraints by selecting an appropriate icon. For example, typical CAD operations are the modeling of the punching or the folding of a 3D modeled object displayed on the screen.

In addition, the one or more operations or functions may be selected directly nearby the modeled product 200 or parts of product 200 displayed in the GUI 100. To this aim, a user-selectable icon 170 associated with operations or functions may appear near a selector 160, e.g. the cursor of a haptic device such a mouse. The user may pass the cursor 160 over the phylactery 170 which, in response, displays a set of icons 180. Typically, the user-selectable icons 170, 180 may have the form of a phylactery. Then the user selects one of the icons of the set of icons 180 in order to perform a function associated with said selected icon. Furthermore, the set of icons 180 behave semantically, that is, the set of icons 180 is suggested by the CAD system according to the operation the user is supposed to have in mind.

The GUI may for example display data 250 related to the displayed product 200. In the example of FIG. 1, the data 250, displayed as a "feature tree", and their 3D representation 200 pertain to a brake assembly including brake caliper and disc. The GUI may further show various types of graphic tool 130,160, for example for facilitating 3D orientation of the object, for triggering a simulation of an operation of an edited product or render various attributes of the displayed product 200.

Figure 2:
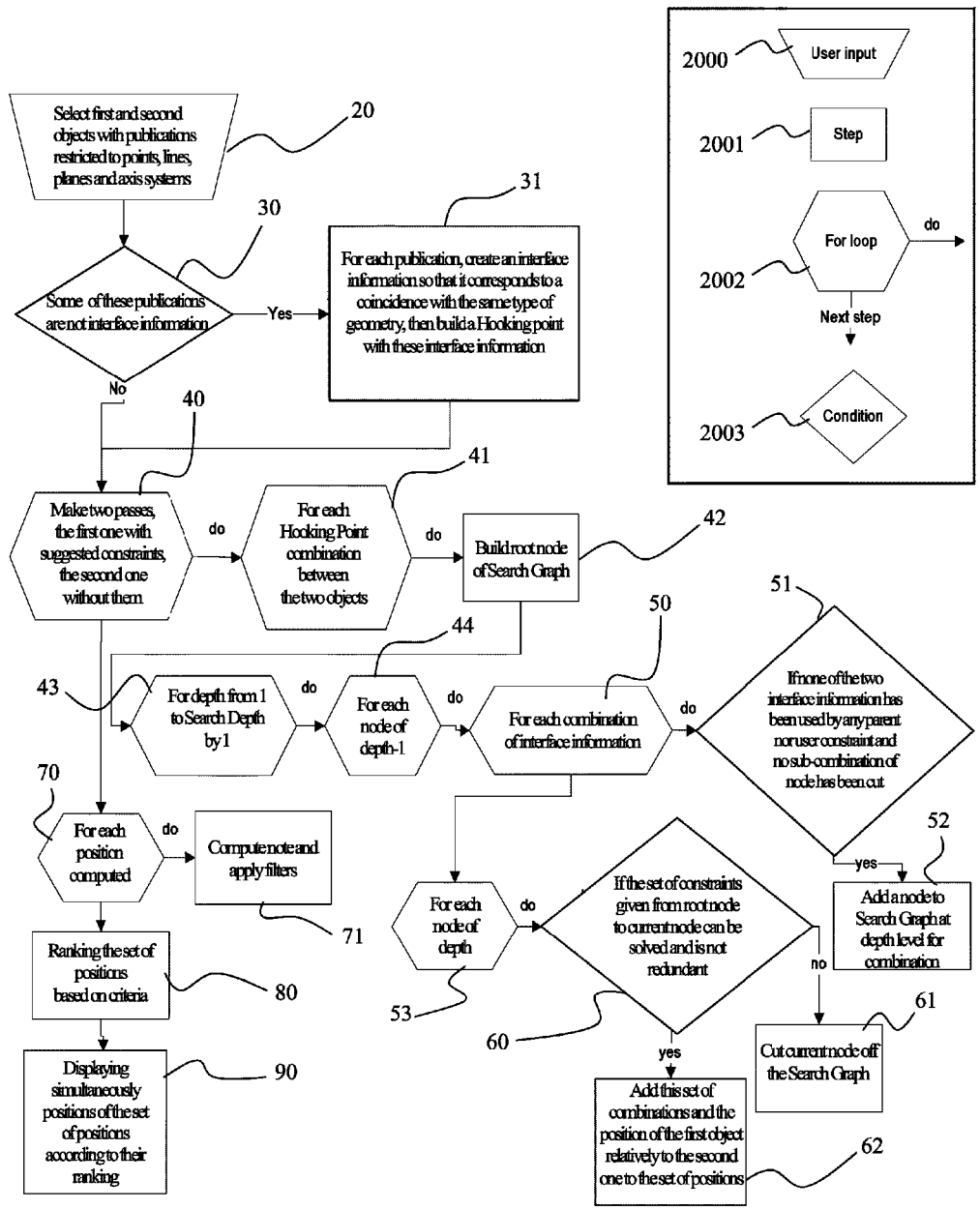
FIG. 2 is a flowchart of an embodiment for carrying out the invention.

FIG. 2 is a flowchart depicting an embodiment of the invention wherein four blocks are to be seen, pertaining respectively to phases of selecting objects having interface information (steps 20, 30, and 31), computing a set of positions of the first object relatively to the second object (steps 40-62), ranking the positions (step 80), and displaying simultaneously the representations of the computed positions (step 90). The various boxes of the flowchart have several shapes: a trapezoid shape 2000 points out a user (e.g. a designer) input, a rectangular shape 2001 represents a stage, an hexagonal shape 2002 shows a loop, and a parallelogram 2003 is a test of a condition.

The depicted embodiment of the invention starts with the selection of a first object and a second object of an assembly of objects. The first object and the second object have interface information. This is illustrated on FIG. 2 by the steps 20, 30, and 31.

At step 20, the first and the second objects of the assembly are selected, that is, they are identified and chosen among the objects of the assembly of objects. The selection may be performed by the system of CAD. The selection may also be performed upon user action, typically in the graphical user interface 100 of the CAD system, as illustrated in FIG. 1. When the selection is carried out by the user, he/she may use a haptic device such as keyboard, a mouse, a stylus, a touch screen, or the like. For instance, in a two-button mouse, the left button could be used for selecting an object when the cursor of the mouse is over a dedicated area of the GUI.

The selected first and second objects may be displayed in the GUI 100. In addition, the selected first and second objects may be modeled objects or three-dimensional (3D) modeled objects. A three-dimensional (3D) modeled object is a description of an object in a three dimensional (3D) space. A 3D space is a geometric model of a physical universe, which may be mathematically represented by a geometry which describes every point in three-dimensional space by means of coordinates. Incidentally, other ways of describing three-dimensional space exist. A 3D modeled object refers essentially to specifications, from which geometry is generated. A 3D modeled object is thus a mathematical description depicting of a 3D object, that is, a collection of points in 3D space, connected by various geometric entities such as triangles, lines, curved surfaces, etc. A 3D modeled object is represented by a 3D representation of the 3D modeled object.

In addition, the first object and the second object of the assembly of objects may be different products. A product is formed of assemblies of objects. Thus, the selection may be carried out on objects of the assembly, or on products of the assembly. The first object may be referred to as the "to place" object (or product) and the second object may be referred to as the "target" object (or product).

The first and the second objects have publications. Typically, publications may be stored (or "embedded") with an object. A publication is a link aggregated under an object to a geometrical element or another publication inside this object, and the publication publishes and makes public mating information about interfacing the first object with other objects of the assembly of objects (e.g. with the second object). Accordingly, a publication may define a set of knowledges of the positioning of an object relatively to at least one other object of the assembly of object. The aggregation (or "embedding") of the publication with the object greatly increases automation when placing an object because both the first and second objects have information required for performing a mating.

A publication is a link to an element of geometry. Advantageously, the elements of geometry may be restricted to points, lines, planes, and axis systems. Typically, the restriction is made according to the technical context of the assembly, e.g. in a mechanical context, the elements of geometry are preferably limited to points, lines, planes, and axis systems. In another technical context (for instance a mechanical system comprising gears), curves would be retained. It results from this restriction that the quantity of information provided to the objects is limited, while keeping a sufficient number of information for mating objects. In addition, the number of positioning solutions of an object relatively to at least one other object is limited, and the most relevant positions are retained. Therefore, better results are provided while the number of tries decreases.

Figure 3:
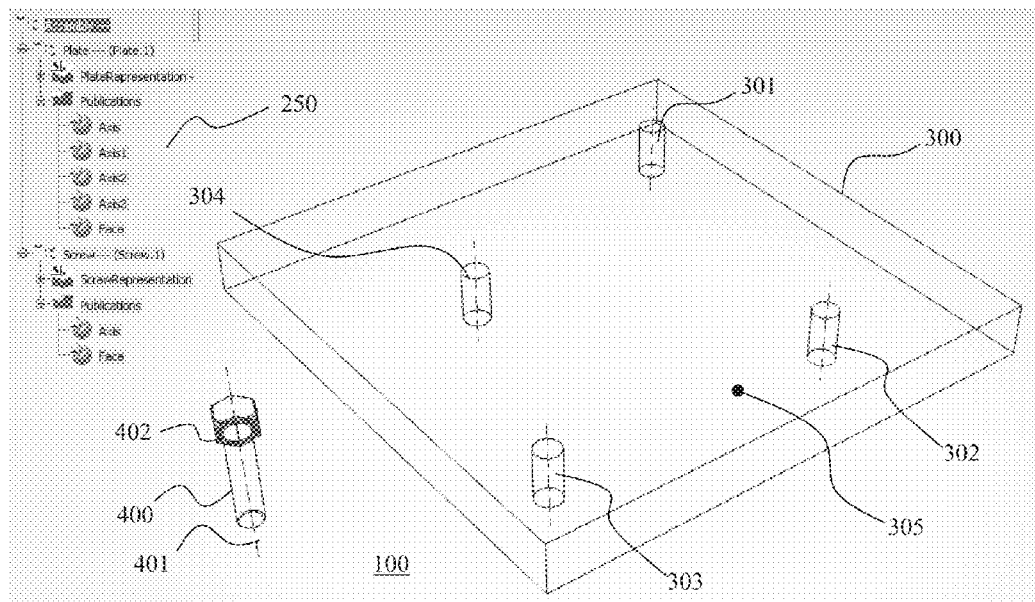
FIGS. 3 to 5 are graphical representation of the method according to the invention.

Referring now to FIG. 3, a plate 300 and a screw 400 are displayed on a GUI 100 as depicted in reference to FIG. 1. The GUI displays data 250 related to the displayed products 300 and 400. In the example of FIG. 3, the data 250 are displayed as a "feature tree" and show the publications of the plate 300 and the screw 400. The screw 400 comprises two publications: a publication of an axis 401 and a publication of a face 402. The plate 300 comprises five publications: one publication for each axis of the holes 301 to 304, and one publication for the face 305. These seven publications of parts of the two products 300 and 400 are published, and designer may have access to the information they contain.

Back to FIG. 2, at the steps 30, the process of the disclosed technology determines whether the publications of the first object and the second object are interface information. If all the publications are interface information, then the next step of the process is the step 40. On the contrary, if some of the publications are not interface information, then the next step of the process is the step 31.

Interface information are publications enhanced by data to build a fully specified constraint with another compatible interface information. Interface information thus provides mating information about interfacing a first object with at last another object of the assembly, the mating information comprising the required knowledges for positioning the first object relatively to at least one other object of the assembly. Therefore, thanks to the interface information, a new object may be added and placed relatively to another object without requiring supplementary information. Using interface information is advantageous for designers as they can add mating information of an object prior the placement of the object. In addition, they may access or not mating information of an object depending their rights on the object. This may lead to reduce designs errors. As a result, the process of positioning of an object relatively to another object is improved and faster.

At the step 31, the process according to the invention identifies at least one publication of the first and the second objects, and computes interface information of the first and second objects for each identified publication of the first and second objects. To this aim, the publications of the first and second objects are enhanced so as to include all available information, such as type of expected geometry, orientation, and distance of the first object, in order to build a fully specified constraint with compatible publications. Thus, interface information are built based on information deduced from the assembled product of the assembly of objects.

In practice, the interface information of the first and second objects are computed in order to be representative of a coincidence with elements of geometry of the assembly of objects, e.g. the most common kinematics joints between products such as coincidence, revolute, prismatic, with point to point coincidences, line to line coincidences, and plane to plane contacts as constraints. Advantageously, interface information are linked to elements of geometry of the object, e.g. the element of geometry may be restricted to points, lines, planes, and axis systems. Similarly as for publications, it results from this restriction that the required quantity of information for mating objects is limited.

Additionally, once the publications of the first and second objects have been enhanced, that is interface information computed, hooking points may be built. A hooking point is a set of interface information or publications having a common identifier. At this stage of the process, a hooking point allows identifying the interface information computed at the step 31.

However, interface information cannot be always computed from publications, e.g. there is not sufficient information available for performing the computation. To this aim, interface information and publications are compatible, which involves that the steps 40-90 may be carried out with publications only, interface information only, or a mix of publications and interface information.

Once the steps 30 and 31 are performed, the steps 40-62 are carried out for computing a set of positions of the first object relatively to the second object of the assembly. At this stage, the first and second objects have interface information and the computation of the set of position may be performed thanks to these interface information. However, as previously mentioned, the computation of the set may be also performed with publications only or a mix of publications and interface information.

The computation of the set of positions between the first and second objects may also take account of supplementary constraints which are suggested constraints. Indeed, before carrying out the aforementioned steps 40-62, constraints may be input, upon user actuation, on the first object and the second object. Advantageously, taking account of the suggested constraints during the computation of the set of positions allows increasing the speed of the assembly process. Indeed, the computed set of position will comprise the design intend of the user, without requiring supplementary time of manipulation to mate the objects, provided that choosing objects to mate and providing suggested constraints are performed simultaneously. Therefore, the number of manipulations while assembling objects is reduced.

Figure 4:
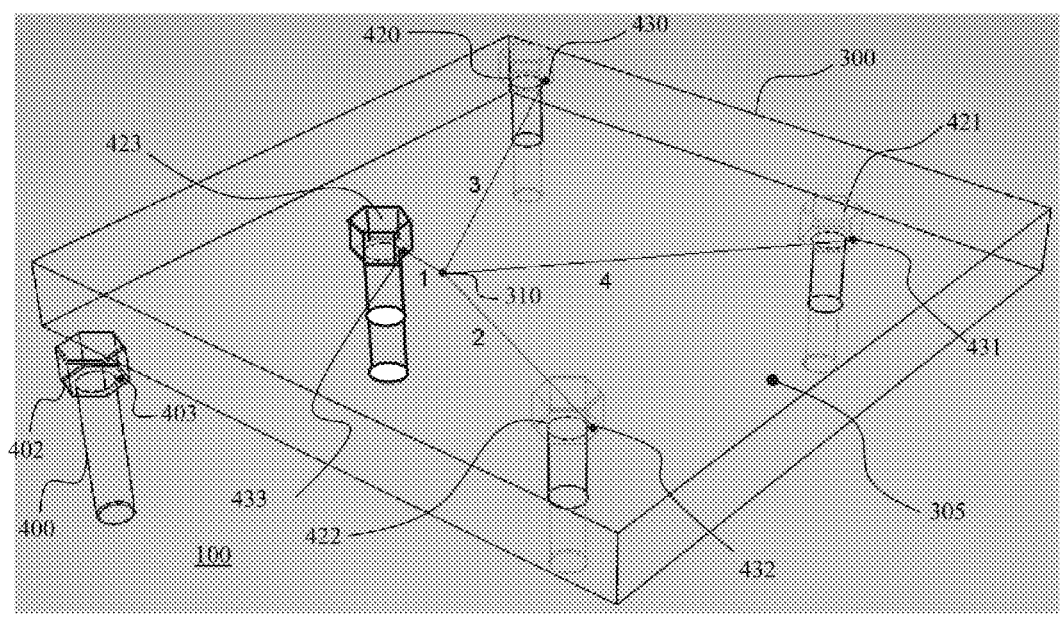

Typically, the user may input the suggested constraints when selecting the first and second objects, e.g. by clicking on the first and second objects, as depicted on FIG. 4 which shows the same screw 400 and plate 300 depicted in FIG. 3. The lower face 402 of the screw 400 is selected by the user by clicking with the cursor of a haptic device on the point 403, and the upper face of the plate 300 is selected by the user by clicking with the cursor of the haptic device on the point 310. It is also possible for the user to suggest constraint via a drag and drop operation. For instance, the user may select the lower face 402 of the screw 400 by clicking on the point 403, drag it over the upper face of the plate 300, and drop the screw 400 when its points 403 is nearby the point 310 of the plate 300. The suggested constraints may also be inputted, for instance, via the "tree" 250 in reference to FIG. 3. In a non-limiting way, any other means may be used in order to suggest constraints, as known in the art.

The sub-steps 41-62 of step 40 are achieved in two passes. The computation of the set of positions of the first object relatively to the second one is first performed taking account of the constraints inputted by the user, and next performed without taking account of the constraints input by the user. Advantageously, the computation in two passes allows computing a set of positions which comprises positions including constraints suggested by the user, but also positions that only use characteristic elements. A position with one or more constraints built from the interface information is then preferred to a suggested constraint that can not be completed with constraints built from the interface information. In particular, if any position taking account of the suggested constraints may be computed, the process according to the invention may however provide at least a set of positions computed from the interface information.

Computing the set of position (steps 41-62) may comprise two sub-steps. The first one is defined by steps 50-52 and consists in computing at least one matching of the interface information of the first and second objects. The second one comprises the steps 60-62 and consists in solving geometric constraints between the first and second objects after each computation of at least one matching performed on steps 50-52. Thus, positions are found (that is, computed) by trying every combination of geometrical constraints provided by the interface information. A combination of geometrical constraints is a position if the combination can be solved and no constraint is redundant with another constraint of the combination.

Preferably, the computation of the matching between interface information of objects and the solving of the geometrical constraints are performed by the means of a dedicated graph structure which is built and traversed during computation and solving steps.

A graph structure, as known in the art, is comprised of nodes connected by arcs. Each node of the graph represents a combination of one interface information of the first object and one interface information of the second object, and each arc represents a possibility to pass from a node to another node.

As seen previously, hooking points of interface information or publications may be computed at step 31. A hooking point allows identifying the computed interface information and creating groups of interface information. Advantageously, any matching between interface information belonging to same hooking points is computed. The number of computations is therefore decreased. Referring back to FIG. 3, one considers a scenario in which interface information are computed starting from publications of the screw 400 and the plate 300. In this scenario, a hooking point of the screw 400 is built from its two publications and a hooking point of the plate 300 is built from its five publications. When computing relative positions, only the matchings between the publications of the screw 400 and the plate 300 are computed.

The graph comprises several levels which are traversed in breadth first (steps 43-44): the sibling nodes of a level are traversed prior their descendant nodes. Thus, the graph is traversed level by level, and a parent level is left for a child level once all the nodes of the parent level have been computed and solved. Each node of the graph, at a given level of the graph, may point on a parent node: a child node is connected to a parent node. However, a child node may point on a parent node only if the combination represented by the child node is already represented by another node in an upper level. In other words, while building the graph structure, a node representing a combination cannot be a child if the combination never appeared before.

In practice, the first level of the graph which is built is the root node (step 42). The root node is the highest level of the graph. Then several levels of the graph are built and traversed (step 43-44). The graph is composed of at least a second level which comprises all the combinations between interface information of the first and second objects. For each node of a given level, one matching of the interface information of the first and second objects is computed (steps 50). If no matching is computed, then the node is cut from the tree. Advantageously, this implies that the search graph allows limiting the number of computation of matching of interface information: indeed, a child node points on a parent node only if the combination represented by the child node is already represented by another node in an upper level. Consequently, the time required to traverse the search graph is increased since combination having no matching cannot be reused in the graph at a lower level. Hence, the overall process for building and traversing the graph is enhanced.

On the contrary, if a matching at a node is computed, then the geometric constraints of the node are solved (step 53). Solving geometric constraints may be performed by a solver as known in the art. One can note that the suppression of the nodes which do not have a matching is advantageous at the step of solving. Indeed, solving geometric constraints requires huge quantities of computational resources of the system, e.g. CPU, memory, . . . . As a result, the disclosed technology allows preserving computational resources and the time required to compute the positions of the set is decreased.

Each node of the graph having not solvable geometric constraints is suppressed of the graph (step 61), while nodes with solved geometric constraints are kept. Thus, the graph is built and traversed step by step. Once the graph has been traversed, a node of the graph provides a position which is then added the set of positions (step 62). The relative position of a node is provided by a set of constraints built from the combination of the node and a set of constraints built from the combinations of the parents of the node.

Incidentally, the number of computations required for computing the positions may be improved thanks to the use of identifiers, e.g. hooking points. To his aim, an identifier between interface information of an object is computed, and the identifier is associated to the respective objects owning the interface. Next, the identifier is used for identifying a matching, during the computation of another matching involving at least one of said first and second objects. Thanks to the identifier, it is possible to identify a former matching of a combination, which provides the possibility to privilege a matching previously computed as being a solution.

At steps 70-71, the solutions computed at steps 40-62 are handled in order to compute data related to the constraints of each of the position of the set of position. Moreover, at step 71, at least one criterion is computed so as to rank the positions of the set. Advantageously, the criteria are computed only one time and then used for ranking the positions of the set, thus limiting the consumption of the resource.

At step 80, the set of positions of the first object relatively to the one are ranked according to at least one criterion. The step of ranking provides a list of positions in which it is easy to determine what the expected position is. Importantly, the ranking is performed according to criteria, that is, standards on which a judgment or decision may be based for ranking the positions previously computed.

In practice, one criterion does not suffice to decide between the positions, and in general, at least two criteria may be used in order to carry out the ranking between the positions. Furthermore, each criterion is ranked and the positions are ranked in lexicographic order relying on the ranked criteria. The lexicographic order provides a natural order structure of two ordered sets. For instance, if the positions of a first set of positions have the same ranking according to a first criterion, then the positions are ranked according to second criterion. As a result, a second set of position is provided and ranked according to the first and the second criterion. If second set comprises positions still having the same ranking, then a third criterion may be used for ranking new set of positions, and so on.

Typically, the first object and the second object of the assembly are three-dimensional modeled objects, and criteria (in a preferred ranking) may be one of the followings:

i) a number of constraints between the first object and the second object of the assembly: this criterion selects the position which solves the most important number of constraints, that is, the positions that are furthermost from the root of the graph structure. Advantageously, this allows promoting position having the less degrees of freedom.

ii) a number of constraints suggested by a user between the first object and the second object of the assembly, the first object being positioned: for a same number of constraints between two positions, the position comprising the most of important number of suggested constraints will be preferred.

iii) a distance between projections in a two-dimensional space of the first object and the second object of the assembly, the first objects being positioned; the first object and the second object are three-dimensional objects. The first and second objects may be projected on a plane, e.g. the plane is defined by the computer screen. The distance may be measured between two picking points previously inputted by the user, e.g. while the user suggests constraints when selecting the first and second objects, as seen previously. Each position of the first object relatively to the second one has thus a picking point, as well as the second object. Distances between picking points of the positioned first and second objects may therefore be measured. According to the measured distances, the position may be ranked. In practice, the position providing the smaller distance between the positioned first object and the second object is privileged: the shorter is the measured distance, the better is the position. Indeed, giving priority to the smaller distance allows improving the general design process because the designer may have the possibility to indicate to the system the position he/she would like to privilege, and this can be performed in an easy way, e.g. by clicking on the objects while selecting the first and the second objects. In addition, the designer does not have to browse accurately the whole second object to have an expected solution: a simple click on the second object is sufficient. Accordingly, most of design errors may be prevented; for instance selecting the wrong second object. Hence, one understands that the recurrent assembly of objects is made in an easier and faster way such that the productivity of the designer is greatly increased.

iv) a distance, in a three-dimensional space, between the first object and the second object which are relatively positioned; the first object and the second object are three-dimensional objects. Similarly, the distance is measured between picking points of the positioned first and second objects, and the smaller measured distance may be privileged. One understands that the same advantages are provided as on point iii).

v) an angle of rotation between the positioned first object and the second object; the first object and the second object are three-dimensional objects. The angle of rotation measures the rotation performed by the selected first object in order to fit with the computed positions. According to the measured angle of rotation, the positions may be ranked. In practice, the smaller angle of rotation is privileged: indeed, it advantageous to privilege the solution which is the closer to what see the designer while designing the assembly of objects. For instance, the screw 400 of FIG. 3 may pass through the holes 301-303 with its head on the upper face or on the lower face of the plate 300. However, as the screw 400 has its head turned to the top when selected, positions with the screw having its head turned to the top are privileged compared to the positions in which the head of the screw is turned to the bottom since the angle of rotation is smaller for the first case that for the second case.

vi) the first positioned object and the second object of the assembly are visible on the graphical user interface. Positions which are visible are privileged compared to the positions which are not. In practice, the positioned first object (the to place object) is visible on the graphical user interface and its picking point is visible in the position of the solution. Advantageously, the designer is not flooded by positions for which he/she does not have interest in: indeed, the designer focuses on few objects of the assembly, and is therefore not interested by the other objects. Incidentally, the designer may zoom out on the assembly, and thus new positions may be taken into consideration during the step of ranking.

vii) a design error, between the positioned first object and the second object, is detected. Typically, a design error may occur when interferences specifications are not respected. Generally interferences specifications encompass clash, contact and clearance specifications. In this respect, it is important to avoid a clash (matter interpenetration) between two objects. In practice, when a clash is detected, the position is suppressed from the set of positions.

The criteria are not limited to the above cited, and any other criterion may be used for ranking the positions. In addition, the ranking of the criteria may be modified by the user. By this way, the ranking of the position fulfils the needs and requirements of the user.

At step 90, representations of the computed positions of the first object relatively to the second object are displayed simultaneously according to the ranking of the computed positions. In practice, the simultaneously displayed representations may be displayed according to several levels of visibility, and each respective level of visibility of the representation of a position is representative of the respective ranking of the position. Accordingly, the computed positions are displayed simultaneously and represented with a respective level of visibility: therefore, the designer is provided an intuitive and efficient way to choose a position among many one. Hence, the life experience of the designer while designing the assembly of objects is increased because he/she can see all possibilities of positions, event those that are difficult to find. Therefore, the designer may easily make his/her choice even if the positions are numerous.

In addition, each displayed representation of a position may have a respective level of transparency. A level of transparency implies that the transparency is not total: thus, positions are always visible for the designer. Partial transparency (or translucency) is achieved when transmitting and diffusing light of a position can be only partial or diffuse. Moreover, the levels of transparency may be determined according to the ranking of the computed position. Typically, the levels of transparency may be determined such that a best position of the ranking (that is, the position which fulfils the most important number of criteria) is displayed with the lowest level of transparency while the worst position (that is, the position which fulfils the less important number of criteria) is displayed with the lowest level of transparency. In other words, the better the position is, the less transparent the displayed position is. In practice, transparency of the best position of the ranking is set to a reference value, and the transparency from the second solution to the last one linearly and regularly decreases from a ceil value (half of the reference value) to a floor value (almost transparent). Moreover, the respective rendering may also be performed according to a color code. Consequently, the view of the designer is no more flooded by the important number of positions as the transparency adjusts the displaying of the positions of the set. Thus, discovering and understanding the assembly of object is easier for the designer and his/her productivity is therefore increased.

Incidentally, if the position having the less transparent representation does not satisfy the designer, he/she still has the possibility to display another position with the same level of transparency as the position having the less transparent representation. For instance, the user may actuate a haptic device, and upon actuation, e.g. upon actuation of a mouse wheel, the computed positions are displayed in a decreasing order based on the ranking of the position.

Figure 5:
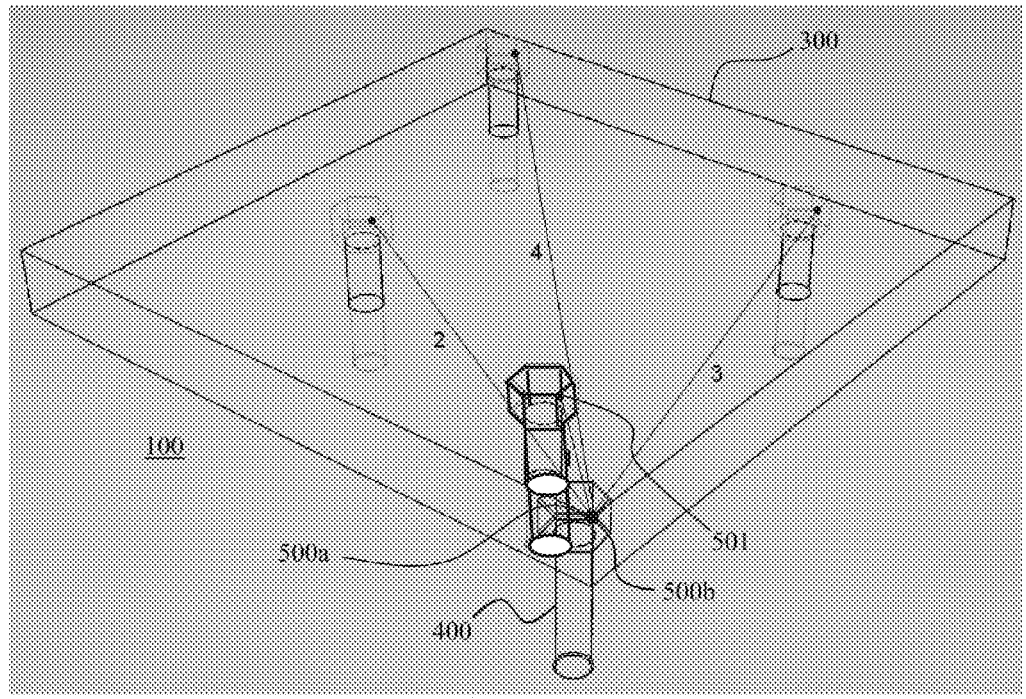

FIGS. 3 to 5 are graphical representations of an embodiment of the method according to the invention. FIG. 3 depicts a plate 300 and a screw 400 which are displayed on a GUI. The screw 400 is a "to place" object, and the plate 300 is a "target" object. A "feature tree" shows in the GUI properties of both objects such as their publications. The screw 400 comprises two publications: a publication of an axis 401 and a publication of a face 402. The plate 300 comprises five publications: one publication for each one the axis of the homes computation of the set of positions 301 to 304, and one publication for the face 305.

Next, on FIG. 4, the user selects, e.g. by means of a cursor of a mouse, the "to place" object 400 by clicking on the point 403 of the lower face 402 of the object 400. Then, the user selects the "target" object 300 by clicking on the point 310 of the upper face 305 of the object 300. Since, publications of the screw 400 and the plate 300 are not interface information, the hooking point of the screw is built from its two publications and the hooking point of the plate is built from its five publications. In addition, the user suggests constraints while selecting the screw and the plate: a user constraint between the upper face of the plate and the lower face of the screw.

Then, the process computes a set of positions between the screw and the plate. To this aim, a graph is built and traversed, in a first pass by taking account of the suggested constraints, and in a second pass without taking account of the suggested constraints. A set of positions is computed and comprises four positions 420-423 based on an axis-axis coincidence of the screw and each hole. At this step, the process could simultaneously display representations of the positions 420-423. In addition, the representation may be displayed according to several levels of visibility. For instance, the simultaneous displayed representation may have respective transparency.

Next, the positions are ranked according to criteria. The first criterion analyses of the number of constraints between the screw and the plate; this number is the same. Therefore, a second criterion is required for separating computed position: the number of constraints suggested by a user between the screw and the plate is the same for each position. A third criterion is then used: the picking point 403 of the screw 400 is placed in each position 420-423, and then distances, in a two-dimensional space, between the points 430-433 and the picking point 310 of the plate 300 are therefore measured. The shorter is the distance, the better is the position. According to FIG. 4, the positions are ranked as follow (the best to the worst): the best position (noted 1) is the position 423 then the positions 422 (noted 2), 420 (noted 3), and 421 (noted 4).

Once ranked, the respective representations of the positions are displayed according to the ranking. In FIG. 4, the position 423 has a better level of visibility than positions 420, 421, and 422.

FIG. 5 is similar to FIG. 4, excepted that the designer has selected a corner 500a of the screw head 400 and a corner 500b of the plate 300. Thus, the constraints suggested by the user are a contact between the two corners. When computing a set of positions, the constraints suggested by the user are completed with constraints built with publications. However, in this case, it results that from this combination of constraints that the combinations are over constraints. Thus, the first pass of the graph which takes account of the suggested constraints fails, and the set of positions is computed only from the second pass of the graph, that is, without taking account of the suggested constraints. As a result, the positions are computed based on the publications of the screw and the plate. Then, the position of the set are ranked, similarly as in FIG. 4, and the solution 501 is displayed on the GUI with a level of visibility more important than the three others positions.

Incidentally, the designer may navigate between the positions. One of the simultaneously displayed positions may be emphasized by placing a cursor on it. Typically, this is performed upon user action on a haptic device, e.g. the cursor of the mouse is placed over the position. The emphasizing of the position may for instance be carried out thanks to a highlight of the position. A highlight consists in applying on the representation of the position an emissive and light colour. The emphasizing may also be performed via visual effects such blinking of the position thickening the outline of the emphasized position, or increasing a density of points forming the outline of the emphasized position. By the way, any means which allows the designer to distinguish a position of the others may be used.

Figure 6:
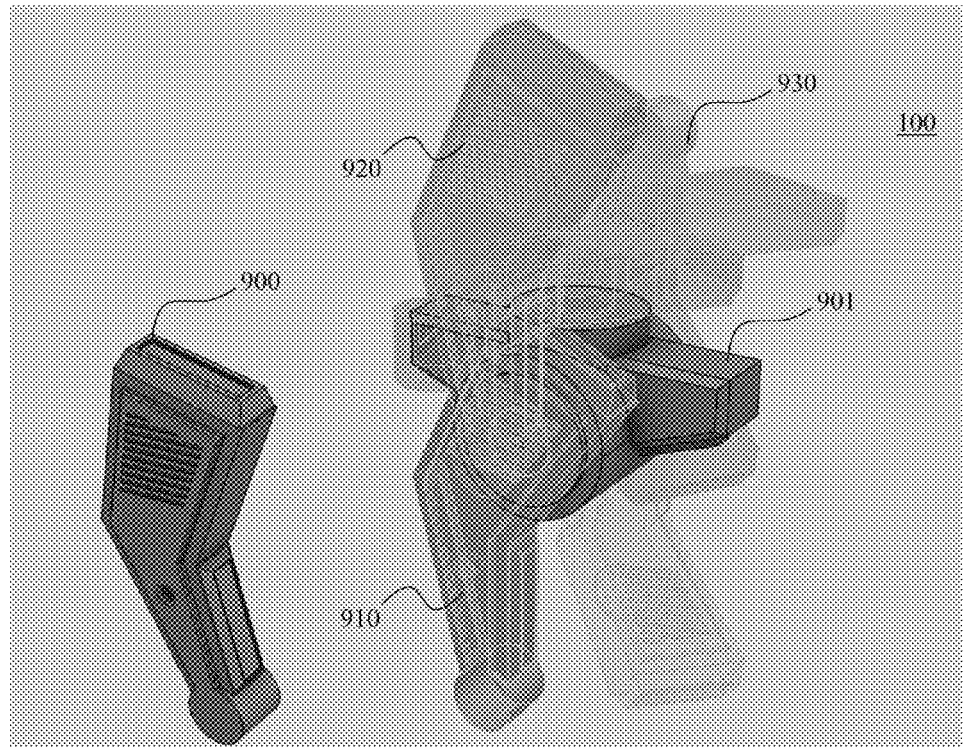
FIGS. 6 to 8 illustrate the mating of a crank with an axis according to the invention.
Figure 7:
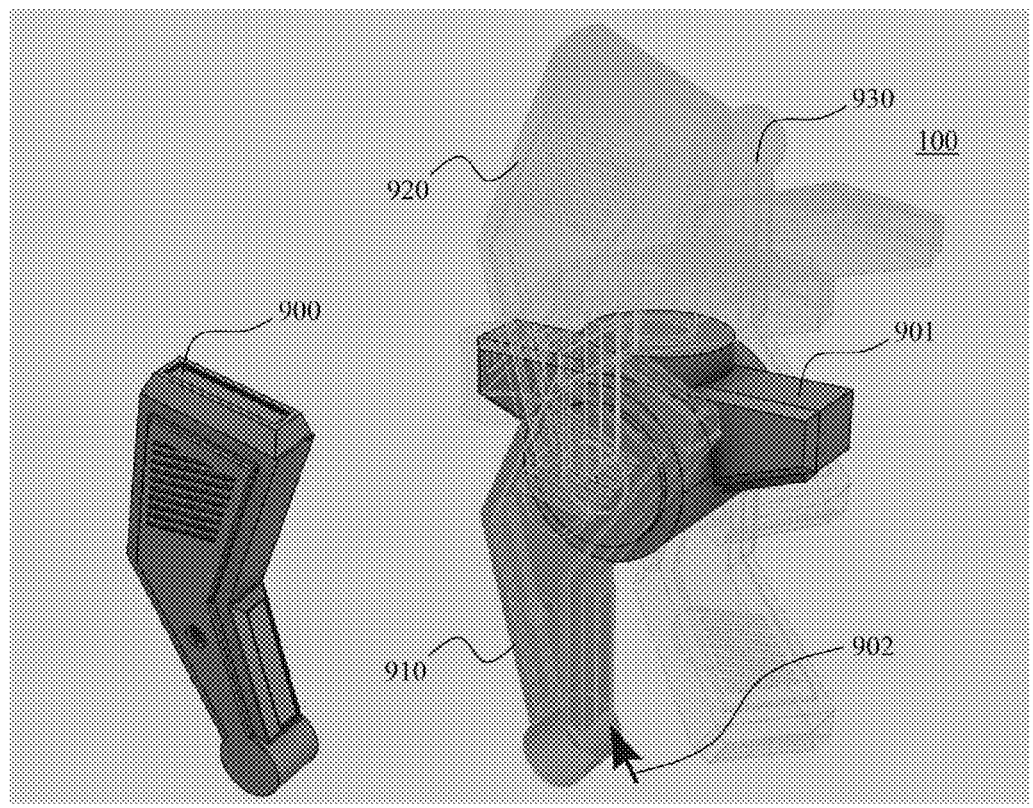
Figure 8:
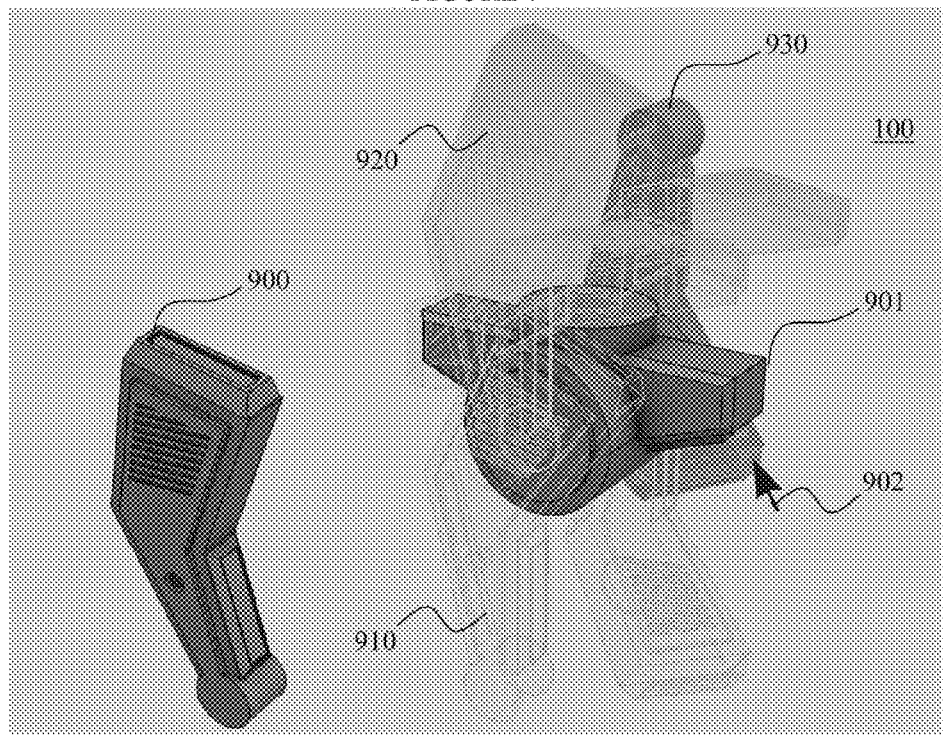

Referring now to FIGS. 6-8, the mating of a crank 900 with an axis 901 is depicted. On FIG. 6, positions of the set positions computed according to the invention are represented on the GUI. Among these representations, the position 910 is the less transparent: indeed, this position is the best position according to the ranking (that is, the position which fulfils the less important number of criteria). The positions 920 and 930 are more transparent. FIG. 6 illustrates the linearity between the transparency and the relevance of computed positions. The user can therefore easily detect what is the best position as the transparency is less important. Meanwhile, if the best position is not considered as relevant for the designer, he/she may still see the other positions.

On FIG. 7, the designer has moved the cursor 902 of a haptic device on the best position 910. The position is therefore emphasized. The designer may consequently pre-visualize a solution based on the best position: the transparency of the other positions is decreased while the transparency of the position 910 is increased. The solution position 910 is thus emphasized, which advantageously permits the user to easily comprehend the solution.

When the designer moves the cursor 902 over another position 930, then this position is in turn emphasized, as illustrated on FIG. 8. The designer can therefore preview each position independently from the others. Meanwhile, the designer may navigate easily among the other positions.

It is to be understood that the foregoing method can be applied to any object in any configuration capable of being defined by a CAD/CAM/CAE system, or any system used to design an assembly of objects. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Figure 9:
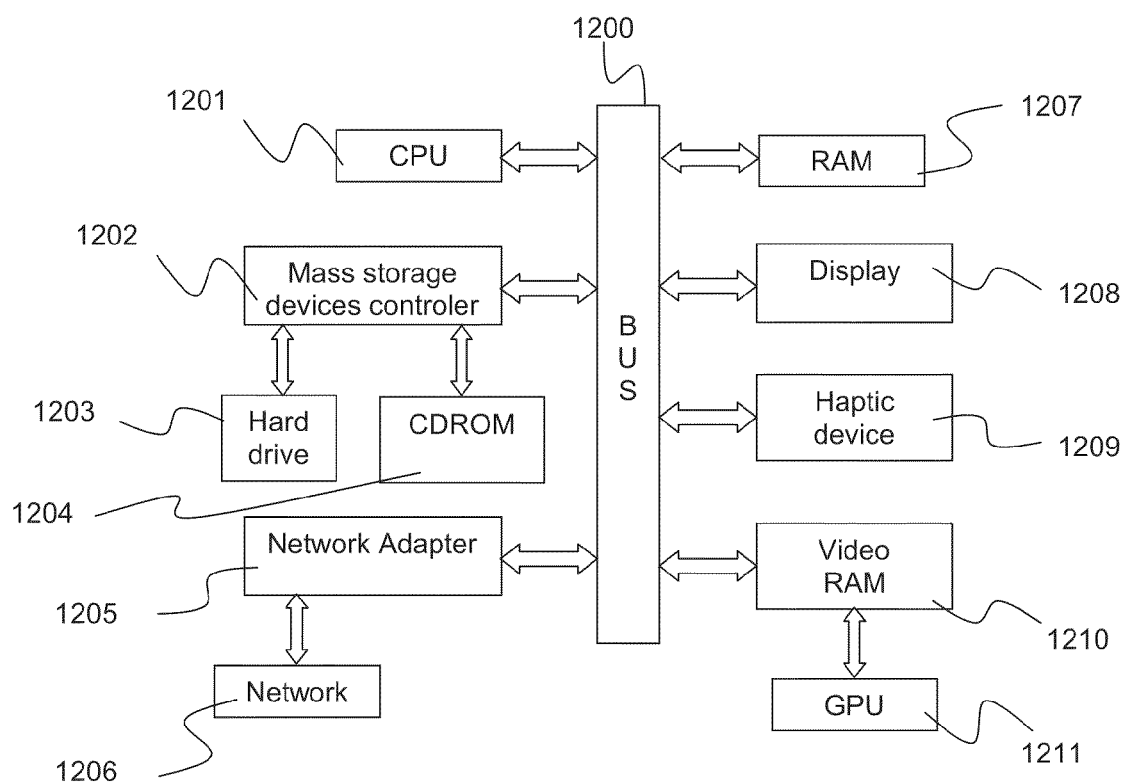
FIG. 9 is a schematic view of a hardware and software environment adapted for carrying out the invention.

FIG. 9 shows a client computer system, e.g. a workstation of a user designing an assembly of objects. The client computer comprises a central processing unit (CPU) 1201 connected to an internal communication BUS 1200, a random access memory (RAM) 1207 also connected to the BUS. The client computer system is further provided with a graphical processing unit (GPU) 1211 which is associated with a video random access memory 1210 connected to the BUS. Video RAM 1210 is also known in the art as frame buffer. A mass storage device controller 1202 manages accesses to a mass memory device, such as hard drive 1203. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1204. Any of the foregoing may be supplemented by, or incorporated in, specially designed ASICs (application-specific integrated circuits). A network adapter 1205 manages accesses to a network 1206. The client computer system may also include a haptic device 1209 such as cursor control device, a keyboard or the like. A cursor control device is used in the client computer to permit the user to selectively position a cursor at any desired location on display 1208. In addition, the cursor control device allows the user to select various commands, and input control signals. The cursor control device includes a number of signal generation devices for input control signals to system. Typically, a cursor control device may be a mouse, the button of the mouse being used to generate the signals.

The preferred embodiment of the present invention has been described. It will be understood that various modifications may be made without departing from the spirit and scope of the invention. Therefore, other implementations are within the scope of the following claims. For instance, the ranking of the criteria may depend on the technical context of the assembly.

The invention claimed is:

1. A computer-implemented method for designing an assembly of objects in a system of computer-aided design, the method comprising:
   selecting, upon user action a first object and a second object of the assembly;
   identifying at least one publication of the first object and at least one publication of the second object, a publication publishing mating information about interfacing an object with another one and comprising elements of geometry;
   computing, in a processor, an interface information of the first object and an interface information of the second object for each said at least one identified publication of the first object and at least one identified publication of the second object, an interface information being a publication enhanced by data to build a fully specified constraint with another compatible interface information;
   computing, in a processor, a set of positions of the first object relatively to the second object of the assembly;
   ranking the positions of the set of the first object relatively to the second object according to at least two criteria, each criterion of the at least two criteria being ranks and the positions of the set are ranked in lexicographic order relying on the ranked criteria; and
   displaying, on a display, simultaneously representations of the computed positions of the first object relatively to the second object.

2. The method of claim 1, wherein the simultaneously displayed representations of the computed positions are displayed according to several levels of visibility.

3. The method of claim 1, wherein the simultaneously displayed representations of the computed positions have a respective transparency.

4. The method of claim 1, wherein the simultaneously displayed representations of the computed positions are displayed according to a ranking of the computed positions.

5. The method of claim 1, further comprising, prior to the step of computing the set of positions, the step of:
   adding constraints, upon user actuation, between the first object and the second object.

6. The method of claim 1, wherein the first object and the second object of the assembly are three-dimensional modeled objects and wherein the said at least two criteria are of the following:
   a number of constraints between the first object and the second object of the assembly;
   a number of constraints suggested by a user between the first object and the second object of the assembly, the first and second objects being relatively positioned;
   a distance between projections in a two-dimensional space of the first object and the second object of the assembly, the first and second objects being relatively positioned;
   a distance, in a three-dimensional space, between the first object and the second object of the assembly which are relatively positioned;
   an angle of rotation between the first object and the second object of the assembly which are relatively positioned;
   the first object and the second object of the assembly, which are relatively positioned, are visible on the graphical user interface;
   a design error, between the first object and the second object of the assembly which are relatively positioned, is detected.

7. The method of claim 1, wherein the step of computing a set of positions of the first object relatively to the second object of the assembly comprises:
   computing at least one matching of the interface information of the first object and the second object; and
   solving geometric constraints between the first object and the second object after each computation of said at least one matching.

8. The method of claim 7, wherein the steps of computing at least one matching of the interface information and solving geometric constraints after each computation of said at least one matching are carried out according to a traversal of a graph, wherein:
   each node of the graph represents a combination of one interface information of the first object and one interface information of the second object;

each node of the graph at a given level of the graph, pointing on a parent node, represents the combination already represented by another node in an upper level of said given level;

each node of the graph having not solvable geometric constraints is suppressed of the graph; and for a given node, a position of the set of positions is provided by:

a set of constraints built from the combination of said given node; and a set of constraints built from the combinations of the parents of said given node.

9. The method of claim 7, wherein the step of computing a set of positions of the first object relatively to the second object of the assembly further comprises:

computing a first identifier between at least two interface information of the first object and a second identifier between at least two interface information of the second object;

associating said first and second identifiers of the interface information to the objects owning respectively said at least two interface information of the first object and said at least two interface information of the second object; and using said first and second identifiers for identifying a matching, during the computation of another matching involving at least one of said first and second objects.

10. The method of claim 1, wherein the step of computing the set of positions of the first object relatively to the second object of the assembly is first performed taking account of the constraints added by the user, and then performed without taking account of the constraints added by the user.

11. The method of claim 1, wherein the interface information of the first object and the interface information of the second object is computed in order to be representative of a coincidence with elements of geometry.

12. The method of claim 1, wherein said elements of geometry are restricted to points, lines, planes, and axis systems.

13. The method of claim 1, wherein one of the simultaneously displayed representations of the computed positions is emphasized by placing a cursor on said one of the simultaneously displayed representations upon user action on a haptic device.

14. A non-transitory computer readable medium containing a computer program for designing an assembly of objects in a system of computer-aided design, the computer program comprising code means for causing the system of computer-aided design to take the steps of:

selecting, upon user action, a first object and a second object of the assembly;

identifying at least one publication of the first object and at least one publication of the second object, a publication publishing mating information about interfacing an object with another one and comprising elements of geometry;

computing, in a processor, an interface information of the first object and an interface information of the second object for each said at least one identified publication of the first object and at least one identified publication of the second object, an interface information being a publication enhanced by data to build a fully specified constraint with another compatible interface information;

computing, in a processor, a set of positions of the first object relatively to the second object of the assembly;

ranking the positions of the set of the first object relatively to the second object according to at least two criteria, each criterion of the at least two criteria being ranks and the positions of the set are ranked in lexicographic order relying on the ranked criteria; and displaying, on a display, simultaneously representations of the computed positions of the first object relatively to the second object.

15. An apparatus for designing an assembly of objects in a system of computer-aided design, the apparatus comprising means for implementing the steps of a method for designing an assembly of objects, the method comprising:

selecting, upon user action, a first object and a second object of the assembly;

identifying at least one publication of the first object and at least one publication of the second object, a publication publishing mating information about interfacing an object with another one and comprising elements of geometry;

computing an interface information of the first object and an interface information of the second object for each said at least one identified publication of the first object and at least one identified publication of the second object, an interface information being a publication enhanced by data to build a fully specified constraint with another compatible interface information;

computing a set of positions of the first object relatively to the second object of the assembly;

ranking the positions of the set of the first object relatively to the second object according to at least two criteria, each criterion of the at least two criteria being ranks and the positions of the set are ranked in lexicographic order relying on the ranked criteria; and displaying simultaneously representations of the computed positions of the first object relatively to the second object.

* * * * *